Patented June 30, 1925.

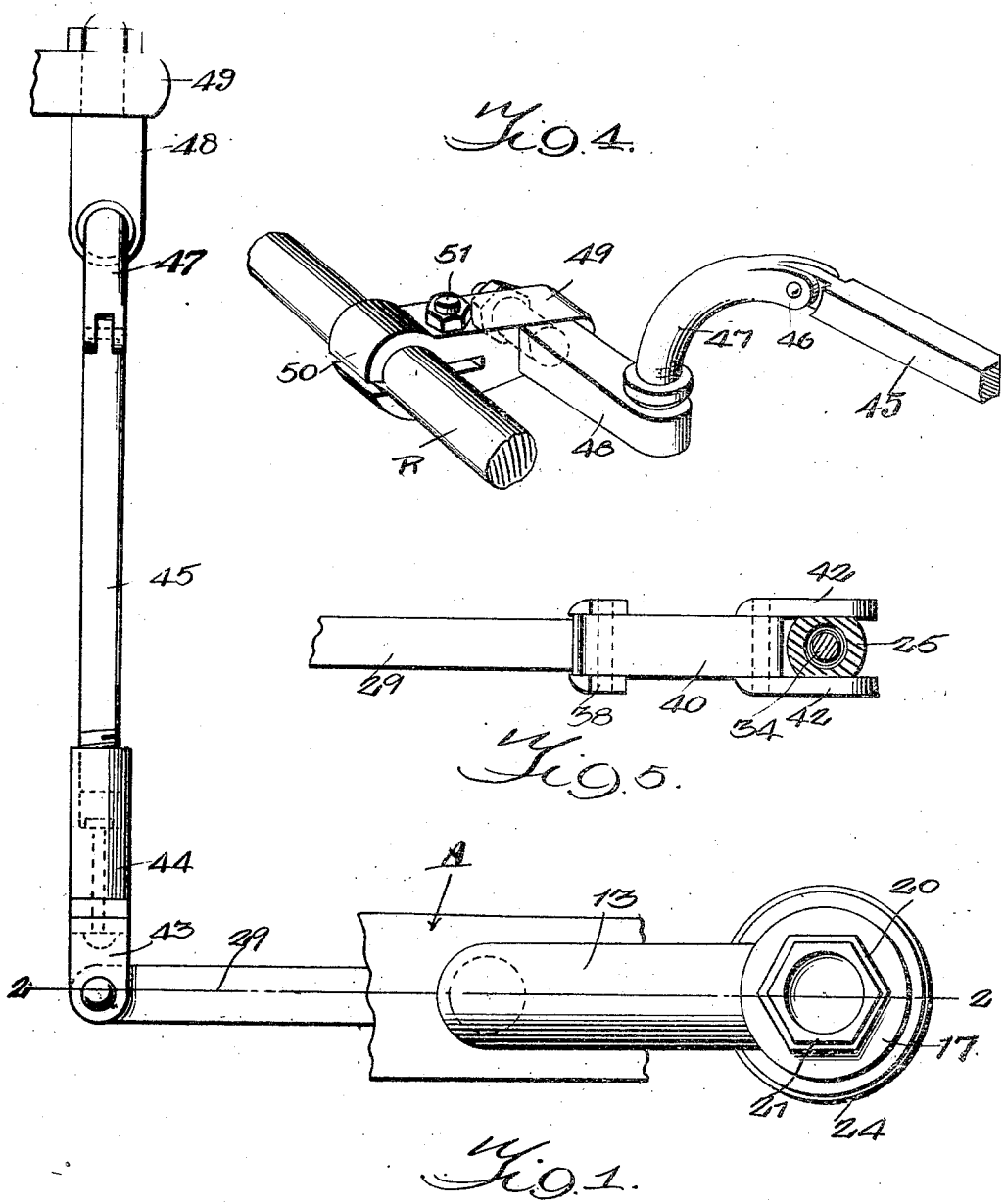

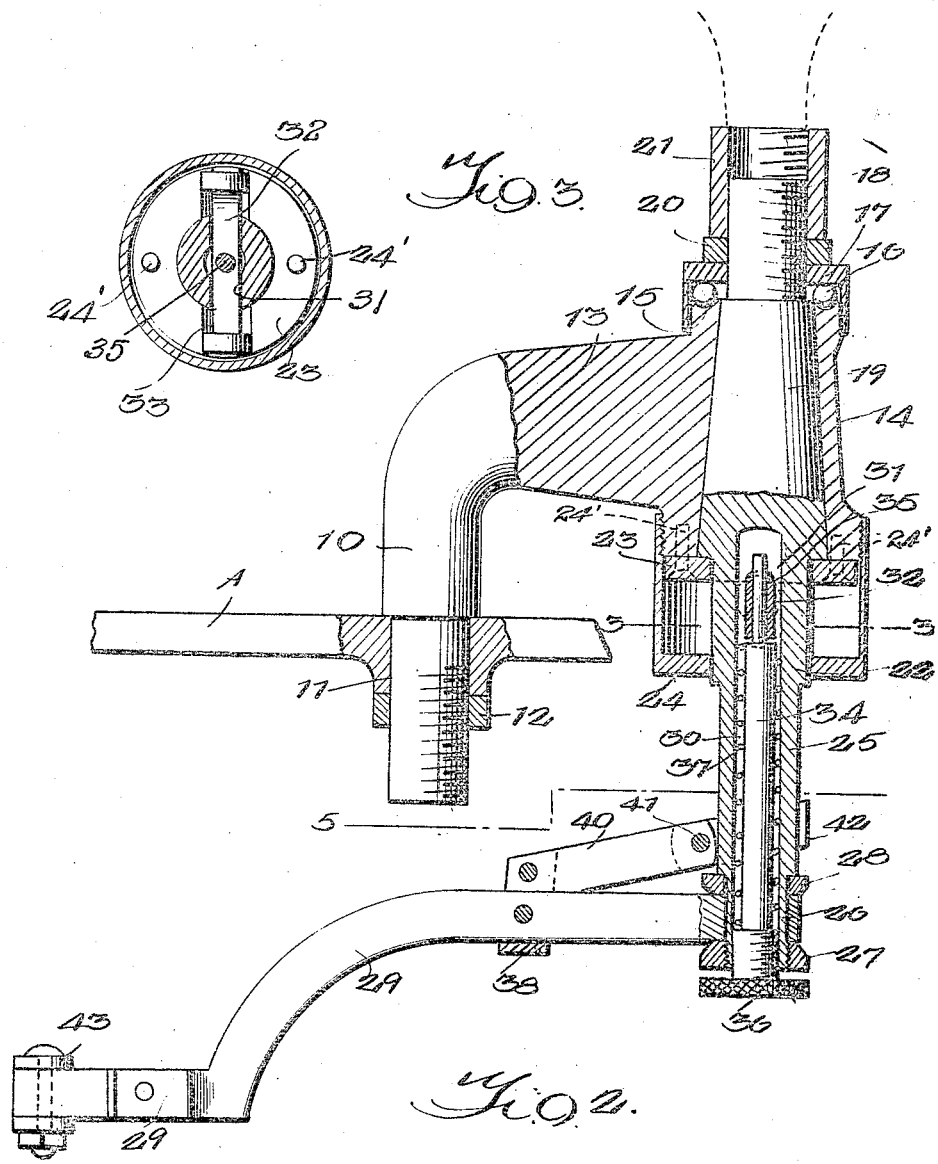

1,544,047

UNITED STATES PATENT OFFICE.

THEODORE H. STINSON, OF SNOHOMISH, WASHINGTON.

DIRIGIBLE HEADLIGHT.

Application filed September 28, 1922. Serial No. 591,137.

*To all whom it may concern:*

Be it known that I, THEODORE H. STINSON, a citizen of the United States, residing at Snohomish, in the county of Snohomish and State of Washington, have invented certain new and useful Improvements in Dirigible Headlights, of which the following is a specification.

This invention relates to vehicles and has special reference to a headlight for automobiles and other like vehicles.

More particularly the invention relates to controlling means for dirigible headlights.

One important object of the invention is to provide an improved general construction of the controlling means for dirigible automobile headlights.

A second important object of the present invention is to provide a novel arrangement whereby the headlights may either be used as stationary lights or as dirigible lights.

A third important object of the invention is to provide a novel arrangement whereby the headlights may be locked in position against rotation when the same is found desirable.

A fourth object of the invention is to provide a novel spindle arrangement for headlights of this character.

With the above and other objects in view as will be hereinafter apparent, the invention consists in general of certain novel details of construction and combinations of parts hereinafter fully described, illustrated in the accompanying drawings and specifically claimed.

In the accompanying drawings, like characters of reference indicate like parts in the several views, and:

Figure 1 is a plan view showing the general arrangement of certain parts of the device as used herewith.

Figure 2 is a side elevation of this arrangement with certain of the parts sectioned on the line 2—2 of Figure 1.

Figure 3 is a section on the line 3—3 of Figure 2.

Figure 4 is a detail perspective showing the swivel connection between the steering rod of an automobile and this device.

Figure 5 is a section on the line 5—5 of Figure 2.

In carrying out this invention there is provided a bracket having a vertical member 10 reduced at its extremity to enter a suitable opening in a part of the frame A of an automobile, the reduced portion being shown at 11. This reduced portion is threaded and a nut 12 is screwed thereon to hold the bracket in position. From the upper end of the vertical portion 10 extends a lateral arm 13 carrying a head 14 having a frusto conical opening therein. At the upper end of this head 14 is a ball race 15 whereon are bearing balls 16 held in a cage or casing 17 which is secured on the reduced end 18 of a frusto conical spindle 19 by a nut 20. The reduced end 18 extends above the nut 20, and carries a coupling nut 21 whereby the upper end of the spindle may be coupled to a lamp standard. Below the frusto conical portion 19 the spindle is reduced as at 22 and surrounding this reduced portion is a collar 23 which is held from rotation by pins 24′ projecting from the head 14 through suitable openings in said columns. These pins 24′ are riveted in position so that the collar is held from slipping off. In place of the pins 24′ screws may be employed if desired, in order to permit ready removal of the collar. The lower end of the head 14 is threaded and on this threaded portion is screwed a housing 24 which is spaced below the collar 23. Below the reduced portion 22 the spindle is again reduced as at 25 and its lower extremity is still further reduced as at 26 by a suitable threaded end to receive the screw collar 27. Bearing against the shoulder formed between the portions 25 and 26 is a collar 28 and fitted on the portion 26 between these two collars is the end of a lever or rock arm 29 which thus is mounted to freely rotate on the spindle. The lower end of the spindle is hollow, being provided with a longitudinally extending opening or bore 30 which is threaded at its lower end. Extending through the wall of the portion 22 are openings 31 and passing through these openings is a lock bar 32 rounded on top so as to engage diametrically disposed grooves 33 formed in the under sides of the collar 23. Screwed into the lower end of the spindle is a lock pin 34 having a reduced end 35 which passes freely through the lock bar 32, being shouldered beneath that bar so as to engage the same when screwed up. This lock pin 34 is provided with a knurled head 36 to enable it to be screwed by hand and surrounding the pin is a spring 37 which normally holds the bar 32 in engagement with the washer or collar 23 so that it snaps in and out of the grooves 33 as the spindle rotates, its position in the grooves being assumed when the headlight throws its light directly ahead. It will be obvious that if the pin 34 be screwed up until its shoulder engages the bar 32 this locking bar is held in the grooves and thus any movement of the spindle is prevented. This locking bar 32 normally serves as means for holding the lamp standard against accidental rotation when the vehicle is moving straight ahead.

On the arm or lever 29 is a bracket 38 from which extends an arm 40 normally resting against the spindle portion 25. This arm 40 has a pivot 41 extending through its end and on this pivot is mounted a pair of fingers 42 which are so spaced as to engage opposite flattened portions formed on the spindle part 25, making when so engaged, a fork which grips the spindle and causes it to rotate or operate as the arm 29 is moved.

Pivoted to the end of of the arm 29 is a fork 43 whereto is swivelled a socket 44 having one end of a connecting rod 45 screwed therein. The other end of this connecting rod is pivoted as at 46 to a goose neck 47 swivelled or pivoted in the end of an arm 48 secured to the outer end of a clamp bracket 49 having jaws 50 drawn together by a bolt and nut 51 so as to clamp the steering rod R of an automobile. Thus, as this steering rod is moved longitudinally the arm 29 is oscillated and, by reason of the swivelling connections at various places freedom of movement of the arm 29 with relation to the rod R is permitted so that the action of the springs of the automobile is not interfered with nor are the parts strained. Also the construction is such that the arm 29 may either be allowed to move freely without affecting the spindle or the fingers 42 may be dropped to make the spindle move with the arm.

In the assembling of the device, the spindle 19 is placed in the bracket 14 after which the bar 32 is placed through the slot 31, it being assumed that the washer 23 is secured to the bracket 13 prior to the insertion of the spindle in its place. A protecting housing 24 is now threaded in place on the bracket 13 and serves as means, as heretofore stated, for protecting the washer 23 and the locking bar 32. The coil spring 37 is now placed around the locking pin 34 and the locking pin is then inserted in the bore and slipped through the opening in the locking bar. The method of assembling the other parts of the device is obvious.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention what is claimed as new, is:—

1. In a dirigible headlight, a support, a spindle for supporting a headlight rotatably carried by the support, a crank arm journaled on the lower end of said spindle for normal swinging movement relative thereto, means carried by the crank arm for movement into and out of locking engagement with the spindle whereby the crank arm can be locked with the spindle for movement therewith, and means carried by the spindle for locking engagement with the support to prevent rotary movement of the spindle when said means carried by the crank arm is moved out of engagement with the spindle.

2. In a dirigible head light, a bracket having a bearing therein, a spindle mounted in said bearing for supporting a head light and having opposed flattened portions, a rock arm journalled on the lower end of the said spindle, a pair of fingers pivotally supported from the rock arm and movable to engage the flattened portions of the spindle between them, and to disengage from said flattened portions whereby to lock and unlock the spindle and arm, and means carried by the spindle for cooperating engagement with the bracket whereby to prevent movement of said spindle in said bracket, and means for moving said arm.

3. In a dirigible head light support, a bracket, a bearing formed on said bracket and having a vertically extending opening, a spindle mounted in said opening for rotation therein, releasable means for imparting rotary movement to said spindle, a locking pin extending upward into said spindle and having screw thread engagement with the spindle at its lower end, a locking bar extending through the spindle and carried on the upper end of said pin, said pin having a shoulder beneath the said bar, a spring urging said bar upward away from said shoulder, a collar carried by the bracket and surrounding the spindle above the bar, said collar being provided with grooves for engagement by the locking bar, and means at the lower end of the spindle for rotating said pin.

In testimony whereof I affix my signature in presence of two witnesses.

THEODORE H. STINSON.

Witnesses:
 ARCHY W. CAMPBELL,
 S. W. MCCRAY.